(12) United States Patent
Steffler et al.

(10) Patent No.: US 6,905,404 B2
(45) Date of Patent: Jun. 14, 2005

(54) SYSTEM FOR HARVESTING ANIMAL PARTS

(75) Inventors: Harold J. Steffler, Holland Landing (CA); Peter L. Migchels, Mississauga (CA); Josef G. Marecek, Gormley (CA)

(73) Assignee: Maple Leaf Foods, Inc., Toronto (CA)

( * ) Notice: Subject to any disclaimer, the term of this patent is extended or adjusted under 35 U.S.C. 154(b) by 347 days.

(21) Appl. No.: 10/057,679

(22) Filed: Jan. 24, 2002

(65) Prior Publication Data

US 2003/0139130 A1 Jul. 24, 2003

(51) Int. Cl.[7] ............................................. A22C 18/00
(52) U.S. Cl. ................................................... 452/149
(58) Field of Search ................................ 235/375, 376, 235/385; 452/149, 150, 182–184, 52, 53, 155, 177, 180, 198

(56) References Cited

U.S. PATENT DOCUMENTS

| | | | | | |
|---|---|---|---|---|---|
| 4,597,495 | A | * | 7/1986 | Knosby | 209/3.3 |
| 4,627,007 | A | * | 12/1986 | Muschany | 452/157 |
| 5,205,779 | A | * | 4/1993 | O'Brien et al. | 452/157 |
| 5,478,990 | A | * | 12/1995 | Montanari et al. | 235/375 |
| 6,059,648 | A | * | 5/2000 | Kodama et al. | 452/135 |
| 6,200,210 | B1 | * | 3/2001 | Pratt | 452/52 |
| 6,231,435 | B1 | * | 5/2001 | Pilger | 452/157 |
| 6,283,848 | B1 | * | 9/2001 | Berry | 452/166 |
| 6,306,026 | B1 | * | 10/2001 | Post | 452/106 |
| 6,443,828 | B1 | * | 9/2002 | Melville | 452/157 |
| 6,551,182 | B2 | * | 4/2003 | Caracciolo, Jr. | 452/81 |
| 6,563,904 | B2 | * | 5/2003 | Wijts et al. | 378/58 |

FOREIGN PATENT DOCUMENTS

| | | |
|---|---|---|
| EP | 0 530 868 A1 | 3/1993 |
| EP | 1 135 990 A2 | 9/2001 |
| WO | WO 01/76378 A1 | 10/2001 |

OTHER PUBLICATIONS

European Search Report corresponding to European Patent Application Ser. No. 03 00 1527.5, dated Apr. 25, 2003 European Patent Office.

United States Department of Agriculture, Food Safety and Inspection Service, FSIS Notice No. 59–01, "Inspection of Poultry Feet (Paws)," Dec. 21, 2001.

* cited by examiner

*Primary Examiner*—Thomas Price
(74) *Attorney, Agent, or Firm*—Marshall, Gerstein & Borun LLP (57) ABSTRACT

A method and apparatus are disclosed for harvesting portions of an animal carcass, most preferably for harvesting chicken paws from a chicken carcass which is determined to be of edible quality. The chicken paws and the remainder of the carcass are separated at a point prior to inspection of the carcass, and are transported toward harvesting stations along separate processing lines. By correlating the shackles on which the feet and the carcass are supported on the respective processing lines, the feet are positively matched to the carcass to ensure that the feet will be harvested only if the carcass is determined to be of edible quality.

28 Claims, 4 Drawing Sheets

SYSTEM FOR HARVESTING ANIMAL PARTS

FIELD OF THE INVENTION

The present invention relates to the harvesting of animal parts, and more particularly to a system for ensuring that parts separated from an animal carcass prior to inspection of the carcass are of edible quality. In a particularly preferred aspect, the invention relates to a system for providing chicken paws of edible quality.

BACKGROUND OF THE INVENTION

In a typical plant for preparing chickens for human consumption, the chickens are supported by their legs in shackles on two automated lines which are typically contained in two separate rooms. The first line, known as the "kill line", is where the chickens are slaughtered and defeathered. The second line, known as the "evisceration line", is where evisceration (organ removal) and inspection are performed. Evisceration involves removal of the internal organs as a "viscera pack", which travels along with the eviscerated carcass through one or more inspection areas. Both the eviscerated carcass and the viscera pack are subjected to at least one inspection to ensure they meet government standards.

Typically, the leg shackles on the evisceration line cannot handle carcasses with feet attached. Therefore, the feet are cut off at the shank immediately prior to the transfer point between the kill line and the evisceration line. The chicken feet remain on the kill line shackles while the remainder of the carcass is transferred, either manually or by machine, to leg shackles on the evisceration line. The feet are subsequently removed from the kill line shackles for disposal or for sale.

Because the feet are separated from the chicken carcasses prior to inspection, the feet removed from the kill line will include feet belonging to birds which are eventually rejected during the inspection process. For this reason, many jurisdictions consider such chicken feet (also referred to herein as "paws") inedible. Currently, the number of jurisdictions prohibiting the sale of "inedible" chicken paws is increasing, resulting in an unsatisfied demand for chicken paws amongst consumers as well as the paws being discarded as waste by chicken processors.

Currently known methods for ensuring that chicken paws are of edible quality yield generally unsatisfactory results. One solution is a batch process in which the feet of a specific group of birds are held back until the carcasses of the birds pass through the inspection process. If all the carcasses in the group pass the inspections, then the feet are considered edible as well. However, even with a low rejection rate, this method is inefficient since it produces low yields of edible chicken paws, and requires additional storage space in which batches of chicken paws can be held.

Therefore, in order to supply saleable chicken paws and to avoid costs associated with disposing of inedible chicken paws, it is desirable to provide a more efficient method by which the feet of rejected birds are reliably discarded to ensure that the chicken paws can be certified as edible product.

SUMMARY OF THE INVENTION

The present invention overcomes the above-described problems in the prior art by providing a system for harvesting animal parts of edible quality, and preferably to a system for harvesting chicken paws of edible quality.

The present invention provides an automated, on-line system in which each shackle on the kill line is correlated to a shackle on the evisceration line, thereby matching each carcass on the evisceration line to a pair of feet on the kill line.

After it is determined by inspection that a carcass is accepted or rejected, the pair of feet removed from that carcass is then also accepted or rejected. Preferably, rejected carcasses are removed from the evisceration line shackles, and at least one sensor is provided on the evisceration line to detect empty shackles. When an empty shackle is detected, the corresponding feet are also rejected.

Thus, the present invention provides a system for positively identifying the paws of any particular chicken carcass on the evisceration line. The present invention also provides a number of failsafe safety measures to ensure that only paws from edible chickens are harvested.

In one broad aspect, the present invention provides a method for harvesting portions of an animal carcass, comprising: (a) at a separation point on a first processing line, separating said animal carcass into a first portion and a second portion; (b) transporting said first portion on a first support means toward a first harvesting point; (c) transporting said second portion on a second support means toward a second harvesting point; (d) correlating the first support means and the second support means such that the first portion and the second portion are positively identified as originating from said animal carcass; (e) conducting an inspection of said second portion at an inspection point between said separation point and said second harvesting point to determine whether or not said second portion meets a predetermined standard; (f) harvesting said second portion at the second harvesting point, unless it is determined that the second portion does not meet said predetermined standard; and (g) harvesting said first portion at said first harvesting point unless one or more predetermined conditions exist, one of said conditions comprising a failure of the second portion to meet said predetermined standard as determined by said inspection.

In another broad aspect, the present invention provides an apparatus for harvesting portions of an animal carcass, comprising: (a) transporting means for transporting said animal carcasses from a starting point to a separation point where the carcass is separated into a first portion and a second portion; (b) first support means for supporting said first portion and moving said first portion from said separation point to a first harvesting point; (c) harvesting means for harvesting said first portion at said first harvesting point; (d) second support means for supporting said second portion and transporting said second portion from said separation point through at least one inspection area to a second harvesting point, wherein said second portion is inspected at said at least one inspection area to determine whether or not it meets said predetermined standard; (e) correlation means for relating said first portion to said second portion such that said first portion and said second portion are positively identified as originating from said animal carcass; (f) inspection data generating means for generating information relating to inspection results for said second portion; and (g) control means for receiving one or more signals from said inspection data generating means and for controlling operation of said harvesting means, each of said signals indicating the existence of one or more predetermined conditions, one of which is a failure of the second portion to meet said predetermined standard, said control means controlling operation of said harvesting means to harvest said first portion only where none of said predetermined conditions exist.

In one preferred aspect, the present invention provides a method for harvesting chicken paws of edible quality from a chicken carcass, comprising: (a) transporting said chicken carcass along a kill line to a separation point, said chicken carcass being supported by its feet in a kill line shackle; (b) at said separation point, separating said feet from said carcass such that said feet remain attached to said kill line shackle; (c) transferring said carcass, after separation from its feet, to an evisceration line by hanging said carcass on an evisceration line shackle; (d) transporting said feet along said kill line toward a paw harvesting station; (e) transporting said carcass along said evisceration line toward a carcass harvesting station; (f) correlating the kill line shackle and the evisceration line shackle such that the feet are positively identified as having been separated from said chicken carcass; (g) conducting an inspection of said carcass at an inspection point between said separation point and said carcass harvesting station to determine whether or not said carcass meets a predetermined quality standard; (h) harvesting said carcass at the carcass harvesting station, unless it is determined that the carcass does not meet said predetermined quality standard; and (i) harvesting said feet at said paw harvesting station unless one or more predetermined conditions exist, one of said conditions comprising a failure of the carcass to meet said predetermined quality standard.

In another preferred aspect, the present invention provides an apparatus for harvesting chicken paws of edible quality from a chicken carcass, comprising: (a) a kill line having a plurality of kill line shackles for supporting said chicken carcass by its feet; (b) first cutter means for separating said chicken carcass from its feet, said first cutter means being located at a separation point on said kill line; (c) a paw harvesting cutter for removing said chicken paws from said kill line shackle, said paw harvesting cutter being located at a paw harvesting station situated on said kill line past said separation point; (d) an evisceration line having a plurality of evisceration line shackles for supporting said carcass after removal of said feet; (e) an automatic transfer machine for transferring said carcass from said separation point to said evisceration line shackle at a transfer point located on said evisceration line; (f) an inspection area located on said evisceration line where said carcass is inspected to determine whether or not it is of edible quality; (e) correlation means for relating said feet to said carcass such that said feet are positively identified as originating from said carcass; (f) inspection data generating means for generating information relating to inspection results for said carcass; and (g) control means for receiving one or more signals from said inspection data generating means and for controlling operation of said paw harvesting cutter, each of said signals indicating the existence of one or more predetermined conditions, one of which is a failure of the carcass to meet said edible quality standard, said control means controlling operation of said paw harvesting cutter to harvest said paws only where none of said predetermined conditions exist.

BRIEF DESCRIPTION OF THE DRAWINGS

The invention will now be described in more detail, with reference to the accompanying drawings, in which.

DETAILED DESCRIPTION OF PREFERRED EMBODIMENTS

A preferred embodiment of the invention relating to a method and apparatus for harvesting chicken paws of edible quality will now be described in detail. However, it will be appreciated that the method and apparatus according to the present invention may be applied to any number of situations where it is desired to separate parts for eventual human consumption from animal carcasses prior to carcass inspection.

Figure 1:
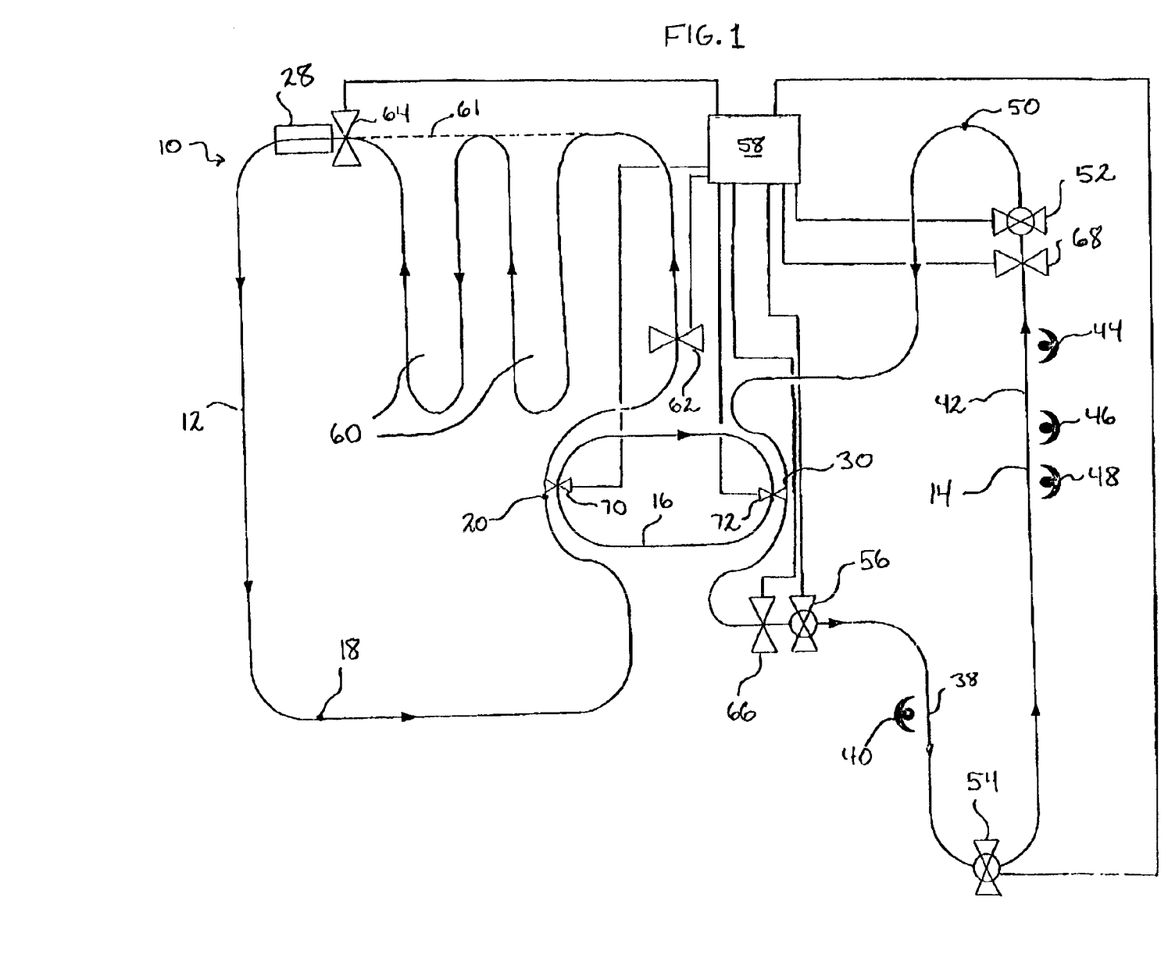
FIG. 1 is a schematic plan view of a preferred apparatus according to the present invention.

FIG. 1 illustrates a preferred apparatus 10 according to the present invention. Apparatus 10 includes two continuous processing lines, a kill line 12 and an evisceration line 14. The lines 12 and 14 are driven independently and therefore the line speeds of the two lines 12,14 may be the same or different. The line speeds of the kill line 12 and eviscerating line 14 are typically in the range of about 100 to about 200 birds per minute. However, it will be appreciated that the invention is adaptable to lines of various speeds. Carcasses 33 (FIGS. 2 and 3) are moved along the lines 12,14 in the directions indicated by the arrows. The apparatus also includes an automatic transfer machine 16 which transfers the chicken carcasses from the kill line 12 to the evisceration line 14 as indicated by the arrows.

Chickens are placed on the kill line 12 at a starting point 18 from which they are transported along the kill line 12 to a separation point 20 at which the chicken feet are separated from the remainder of the chicken carcass. Between the starting point 18 and the separation point 20, the chickens are slaughtered, bled and defeathered.

Figure 4:
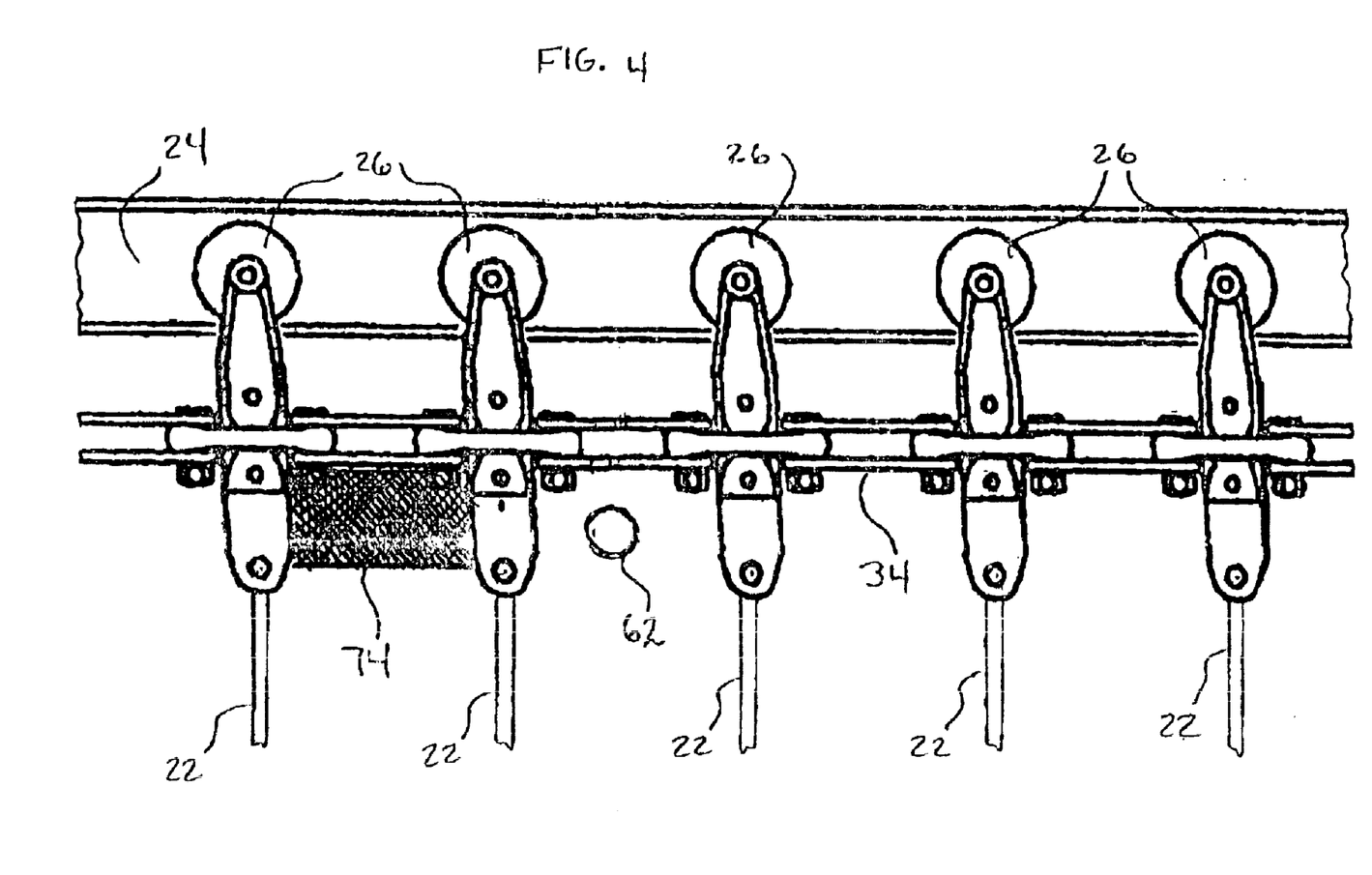
FIG. 4 illustrates preferred indexing means and a preferred arrangement for movably supporting shackles on a processing line.

The means by which the chickens are transported from the starting point 18 to the separation point 20 comprises a plurality of shackles 22 (FIG. 2) which, as shown in FIG. 4, are hung from a continuous overhead track 24 along which they move by means of support wheels 26. The kill line shackles 22 are connected together in fixed relation to one another by a drive chain 34 (FIG. 4) which is driven by driving means (not shown). It will be appreciated that the shackles shown in the drawings are specifically designed for use with chickens, and that different types of shackles may be used during the processing of other types of animals.

Figure 2:
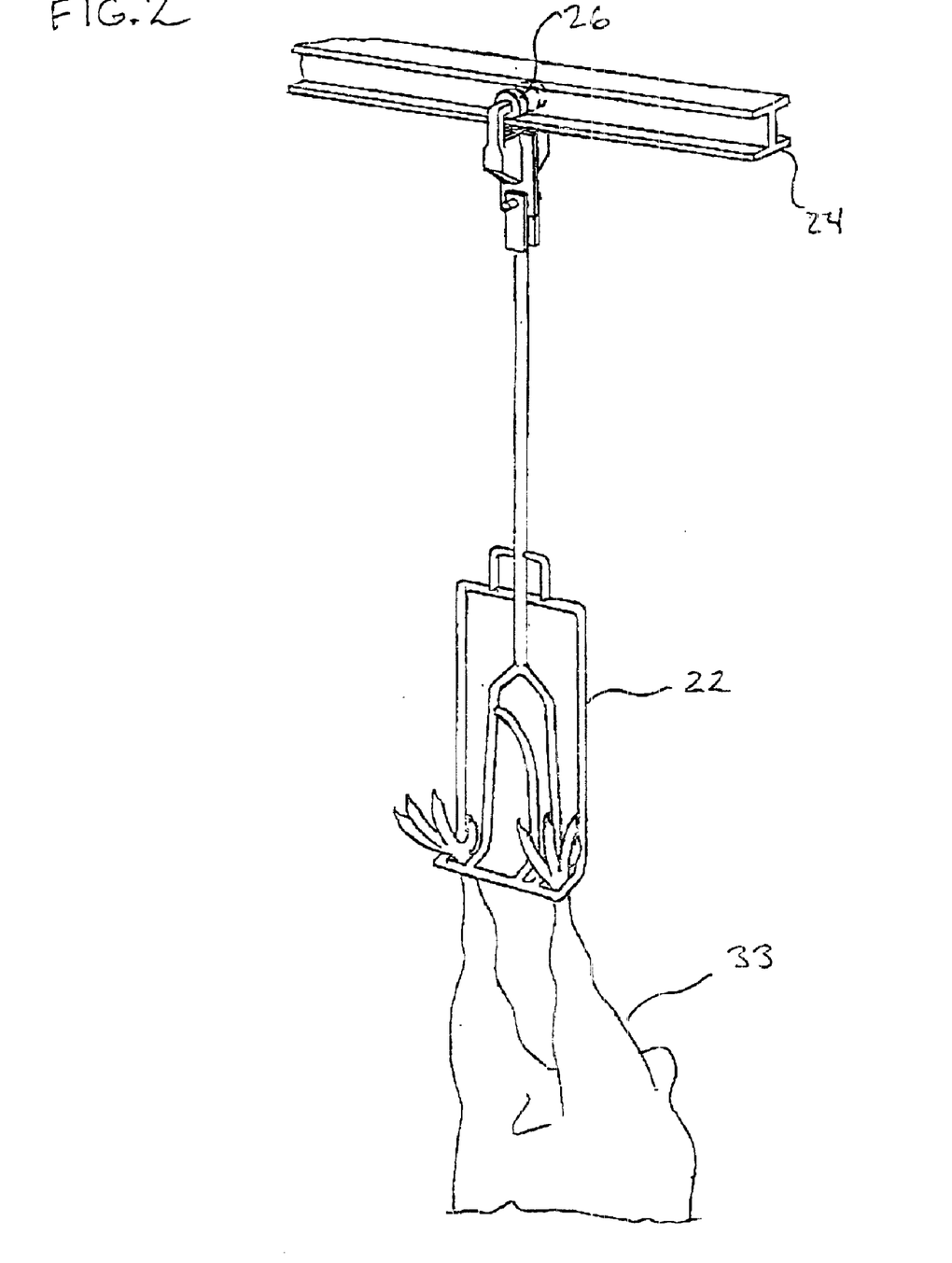
FIG. 2 illustrates a carcass (with feet attached) supported in a kill line shackle.

As shown in FIG. 2, each chicken is hung by its feet in a shackle 22 as it travels from the starting point 18 to the separation point 20. At the separation point 20, a cutter (not shown) separates the feet from the chicken carcass such that the feet remain attached to the kill line shackle 22 and the remainder of the carcass becomes detached from the shackle 22. The feet of the chickens supported by the kill line shackles 22 continue along the kill line 12 toward a harvesting station 28 at which harvesting means in the form of a cutter (not shown) is located. The cutter separates the paw from the shank portion of each foot. Once separated by the cutter, the paws and the shanks fall away to opposite sides of the shackles 22. The paws are then collected for further processing, and the empty shackles 22 travel back toward to the starting point 18.

The automatic transfer machine 16 is provided with a plurality of carriers (not shown), each of which receives a chicken carcass at the separation point 20 at substantially the same time that the feet are cut from the carcass. The transfer machine includes a plurality of carriers, located in fixed relation to one another, and traveling in a continuous loop in the direction of the arrow shown on the transfer machine 16.

The carriers on the transfer line 16 transfer the carcasses 33 from the separation point 20 on kill line 12 to a transfer point 30 located on the evisceration line 14. The evisceration line 14 is similar to kill line 12 in that it comprises a plurality of shackles 32 (FIG. 3) hanging from a continuous overhead track 25 along which the shackles 32 are movable by means of support wheels 27. The shackles 32 on evisceration line 14 are connected together in fixed relation to one another by a drive chain 35 and are driven by a driving means which is separate from the driving means driving the kill line.

Figure 3:
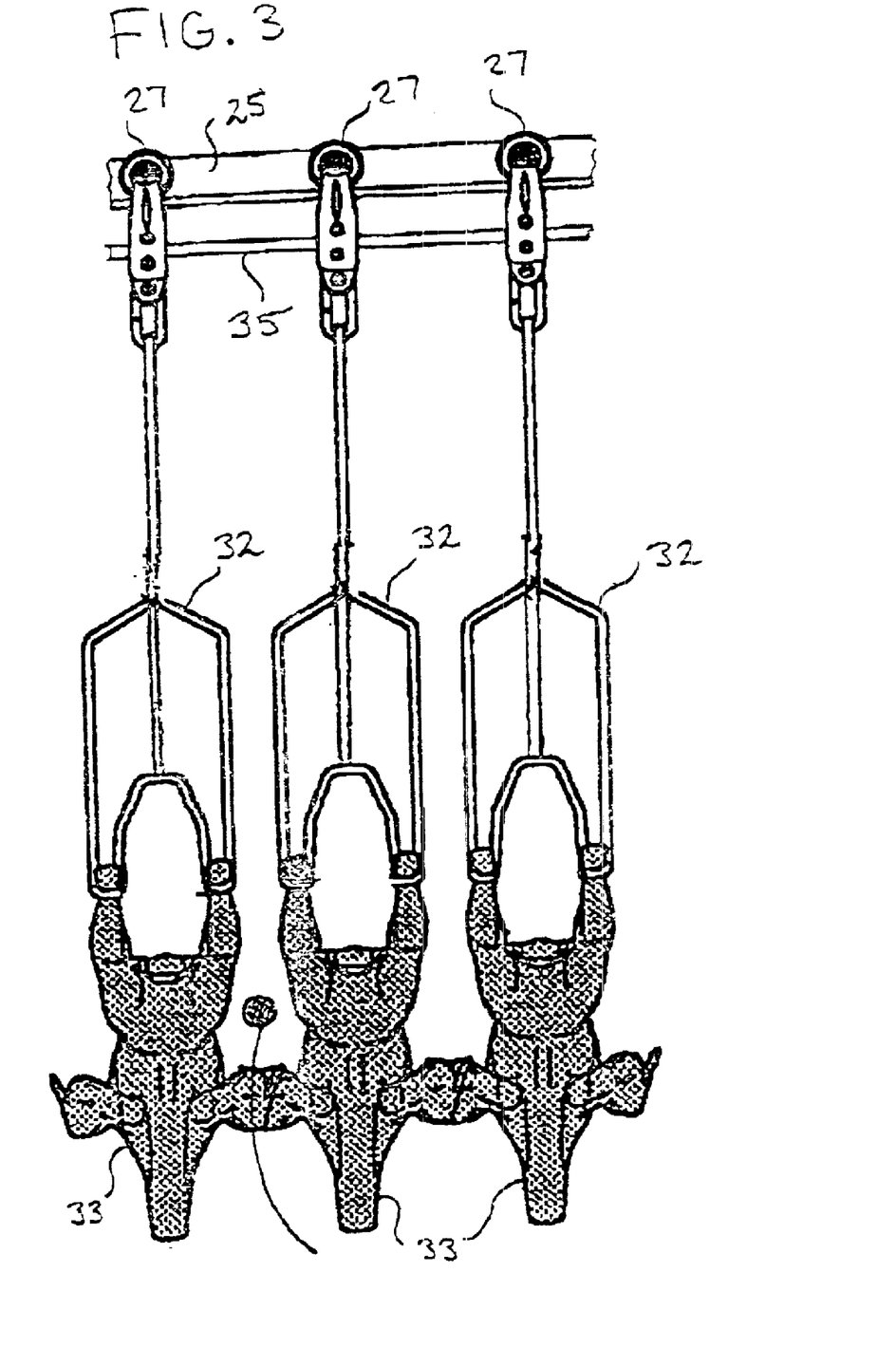
FIG. 3 illustrates a carcass (after separation of feet) supported in an evisceration line shackle.

At the transfer point 30, the automatic transfer machine 16 hangs the chicken carcasses in shackles 32, such that they are supported by the drumsticks as shown in FIG. 3. From the transfer point 30, the carcasses travel along the evisceration line through at least one inspection area where each of the carcasses is inspected to determine whether or not it meets a predetermined standard.

In the preferred embodiment of the invention, the predetermined standard is a government-prescribed quality standard which is used to determine whether or not each carcass is of edible quality. However, it will be appreciated that the present invention can be used in conjunction with other predetermined standards, for example to ensure that the carcass or the parts removed from the carcass have a particular size, weight or other attribute. Furthermore, adherence to the predetermined standard is not necessarily determined by a visual inspection, but may be confirmed by other means, for example by electronic sensors, etc.

In the preferred embodiment of the present invention, two inspection areas are provided along the evisceration line. However, it will be appreciated that the present invention could be operated with fewer or more inspections, depending on the specific standards being imposed. For example, different jurisdictions may require different types and numbers of inspections to be conducted.

The first inspection area in the preferred embodiment of the invention comprises a pre-inspection area 38 at which a technician 40 inspects the exterior of each carcass coming from the transfer point 30 for obvious signs of disease. When a diseased carcass is detected, technician 40 removes the carcass from its shackle 32.

From the pre-inspection area, the carcasses travel along the evisceration line 14 to a final inspection area 42. Between the pre-inspection area 38 and final inspection area 42, the carcasses are eviscerated by opening the body cavity and removing the internal organs therefrom as a viscera pack. At the final inspection area 42, the body cavities are open for visual inspection by one or more technicians 44, 46, 48 to determine whether or not the carcasses are of edible quality. The viscera packs travel along the evisceration line connected to the carcass, or along a separate line parallel to the evisceration line and in close relation to the carcasses, thus permitting the carcasses and the viscera packs to be inspected together at the final inspection area. Where a carcass or a viscera pack is detected at inspection area 42 which does not meet the predetermined quality standard, it is removed from its associated shackle 32 by a technician 44, 46, 48, along with its associated viscera pack or carcass.

The carcasses which pass the inspections at areas 38 and 42 could then be removed at a removal point 50, from which the empty shackles 32 are returned to the transfer point 30. Acceptable viscera packs are also removed after passing the final inspection area 42.

The apparatus 10 further comprises means for generating information relating to inspection results for each of the carcasses. These inspection data generating means preferably comprise one or more carcass sensors located at specific points along the evisceration line 14.

Most importantly, a carcass sensor 52 is provided on the evisceration line 14 at a point which is past the final inspection area 42. Sensor 52 is positioned at the level of the carcasses passing by on the evisceration line 14, and detects the presence or absence of a carcass on each of the shackles 32. Thus, carcass sensor 52 generates data which is representative of the final inspection result, i.e. when sensor 52 detects a carcass on a shackle 32, this is indicative that the carcass and its associated viscera pack have passed the final inspection, and where sensor 52 detects an empty shackle, this is indicative that the carcass and/or the viscera pack have failed the final inspection.

The preferred apparatus 10 further includes a carcass sensor 54 positioned between the pre-inspection area 38 and the final inspection area 42, and preferably positioned immediately past the pre-inspection area. This carcass sensor 54 is located at the level of the passing carcasses and detects the presence or absence of carcasses on the shackles 32 as they move past the pre-inspection area 38. Specifically, the presence of a carcass on a shackle 32 moving past sensor 54 is indicative that the carcass has passed the pre-inspection, and the absence of a carcass on a shackle 32 moving past sensor 54 is indicative that the carcass has failed the pre-inspection and has been removed from the evisceration line 14.

Apparatus 10 preferably also includes a carcass sensor 56 is provided at a point immediately past the transfer point 30. Carcass sensor 56 detects whether or not each carcass has been effectively transferred from the transfer machine 16 to the shackles 32 on the evisceration line 14.

It should be noted that carcass sensors 54 and 56 are provided to account for the fact that a small percentage of carcasses (typically on the order of 1%) will be mis-hung on the evisceration line 14, and most of these mis-hung carcasses will be manually re-hung on empty shackles 32 at some point ahead of the final inspection area. The greatest source of mis-hung carcasses is the automatic transfer machine 16, due to the need to transfer the carcasses from the transfer machine carriers to the evisceration line shackles 32 Even though re-hung carcasses may pass the pre-inspection and the final inspection, it is not possible to match a re-hung carcass to a pair of feet on the kill line 12 with any certainty. Accordingly, the apparatus of the present invention is configured so that the paws of re-hung birds will be rejected.

The technician 40 at the pre-inspection area 38 typically re-hangs some carcasses which have not properly been transferred from the transfer machine 16 to the evisceration line 14. To prevent a "false positive" inspection result at the pre-inspection area 38, the technician 40 is not permitted to re-hang carcasses on shackles 32 from which unacceptable carcasses have been removed.

It will be appreciated that the number of carcass sensors on the evisceration line 14 could be reduced if technicians were instructed not to re-hang carcasses. Specifically, it would then be possible to merely provide a single carcass sensor 52 past the final inspection area 42, which would indicate with certainty whether or not a carcass has passed or failed the inspections. However, it is desirable to re-hang the carcasses as early as possible on the evisceration line 14 to avoid a back-up of carcasses which must be manually processed and inspected, and therefore it is preferred to provide additional carcass sensors 54 and 56.

Thus, in the preferred apparatus 10 according to the present invention, three sensors generate data for each carcass, relating to whether or not the carcass has passed the pre-inspection and the final inspection, with a margin of error to account for uncertainty caused by re-hung carcasses. It will be appreciated that on some processing lines there may be more or fewer stations where a carcass can be re-hung, therefore requiring more or fewer sensors. As a general rule, it is preferred to provide carcass sensor for each station at which carcasses can be removed from or added to the processing line.

Each of the carcass sensors 52, 54, and 56 is in communication with a control means which is preferably, but not necessarily, in the form of a programmable logic controller (PLC) 58. The function of the PLC may instead be performed by other means, such as relay logic and/or computer software.

Each sensor generates a signal for each shackle 32 moving from the transfer point 30 to past the final inspection area 42. Each signal generated in respect of each shackle 32 indicates whether or not that shackle 32 was empty as it moved past any of the sensors 52, 54, 56. The PLC 58 processes this information and controls the operation of a cutter located at the harvesting station 28. When a carcass has been detected on a shackle 32 by all three carcass sensors 52, 54, 56, it can be said with certainty that the carcass is not a re-hung bird, and has passed both the pre-inspection and the final inspection. On the other hand, where any one shackle 32 is empty as it passes at least one of the carcass sensor 52, 54 and 56, that carcass has either been removed from the evisceration line due to a failed inspection or is a re-hung carcass, and therefore the paws relating to these carcasses should not be harvested.

The PLC is programmed so that when an empty shackle 22 is detected by one of the carcass sensors 52, 54 and 56, the PLC sends a signal to the cutter at the harvesting station which causes the cutter to not harvest a corresponding pair of paws relating to that carcass. For example, the cutter head may preferably be in a raised position when it is cutting paws from the chicken feet in the kill line shackles 22. When it receives a signal from the PLC indicating that a pair of feet is unacceptable, the cutter head is lowered at an appropriate time such that the pair of feet from the rejected carcass travel past the cutter without being cut. The rejected feet are then removed from the shackle 22 and discarded with the remainder of the waste remaining on the kill line shackles 22 after paw harvesting.

Due to the rate at which paws are moving through the harvesting station, it may be desirable to provide a buffer so as to ensure that all feet from rejected carcasses will be discarded. The buffer also eliminates uncertainty in the identity of a pair of feet which may be caused by a miscount, for example due to a sensor malfunction, or which may be the result of stretching of the drive chain. Accordingly, the PLC may preferably control the harvesting cutter such that the cutter head will be lowered so as not to remove paws from the rejected pair of feet as well as the feet immediately ahead of and behind the rejected pair. Preferably, the PLC is programmable so as to allow adjustment of the buffer size.

One significant advantage of the present invention is that it is conducted online using standard processing equipment with very little modification being required. One modification which may be required is that the kill line 12 may need to be lengthened to ensure that the distance between the separation point 20 and harvesting station 28 on the kill line is great enough such that the chicken feet will remain on the kill line 12 until such time as the carcasses have passed the final inspection area 42 and carcass sensor 52. Lengthening the kill line 12 involves insertion of additional track and shackles 22, for example by forming additional rows 60 of track which are relatively compact and can typically be accommodated in an existing kill room. The dotted line 61 shown in FIG. 1 is indicative of the original kill line configuration prior to installation of rows 60.

The apparatus 10 also comprises means for correlating each of the carcasses on the evisceration line 14 to a corresponding pair of feet on the kill line 12. The means for correlating the carcasses and the feet comprise a plurality of shackle sensors arranged on the kill line 12 and the evisceration line 14, as well as a plurality of carrier sensors arranged on the automatic transfer machine 16, the sensors being linked with the PLC.

In the preferred apparatus 10, a pair of kill line shackle sensors 62, 64 are provided on the kill line 12, with sensor 62 being positioned proximate the separation point 20 and sensor 64 being positioned proximate the harvesting station 28. Thus, the sensors 62,64 permit the PLC to identify each kill line shackle 22 between the separation point 29 and the harvesting station 28 by number.

Similarly, a pair of evisceration line shackle sensors 66,68 are provided on the evisceration line 14, with sensor 66 being positioned proximate the transfer point 30 and sensor 68 being positioned past the final inspection area 42. The sensors 66,68 allow the PLC to identify each evisceration line shackle 32 between the transfer point 30 and a point beyond the final inspection area 42 by number.

The transfer machine 16 is preferably provided with a pair of carrier sensors 70 and 72, with sensor 70 being positioned proximate the separation point 20 and sensor 72 being positioned proximate the transfer point 30. The carrier sensors 70,72 permit the PLC to identify each carrier by number.

By receiving data from the shackle sensors 62,64,66,68 and carrier sensors 70,72, the PLC 58 is able to identify each carrier and each shackle on specific portions of the kill line 12 and the evisceration line 14. With this information, the PLC is then able to relate a specific kill line shackle 22 to a specific carrier on transfer machine 16 to which a carcass is transferred, and to similarly relate a specific carrier on transfer machine 16 to a specific evisceration line shackle 32 to which a carcass is transferred. By relating a specific kill line shackle 22 and a specific evisceration line shackle 32 to a specific carrier, the PLC is then able to directly relate an evisceration line shackle 32 carrying a carcass to a specific kill line shackle 22 carrying a pair of feet separated from that carcass.

It is preferred that the count of shackles 22,32 on lines 12 and 14 be periodically restarted to ensure that the shackle count remains constant and the kill line 12 and evisceration line 14 remain in synchronization. This is preferably accomplished by providing some sort of indexing means at one or more points on the kill line 12 and the evisceration line 14, the indexing means being recognizable by the sensors to set the count back to zero. It may be preferred to provide two or three of such indexing means equally spaced from one another on each line 12,14. Thus, if a counting error occurs due to a sensor malfunction, the count will be correctly reset after one third or one half of a cycle, rather than a full cycle. As an additional safety feature, where a shackle miscount is detected the harvesting of feet is preferably discontinued until the count is reset and the kill line and evisceration line are properly synchronized. Again, resetting the count after one third or one half of a cycle minimizes the time required to reset and resynchronize the lines, thereby minimizing the number of acceptable feet which are wasted. A preferred indexing means in the form of an index band 74 is illustrated in FIG. 4, which also shows the positioning of sensor 62 which detects the shackles 22 and the index band 74. The index bands 74 are preferably of a color which can be easily detected by the sensor. In the present invention, the inventors have found that a dark color such as black provides the necessary contrast with the background which permits it to be readily detected by the shackle sensors. However, it will be appreciated that index bands of different or lighter color may be preferred under certain circumstances.

The invention has been described in connection with a preferred embodiment for processing chickens and parts thereof. However, it will be appreciated that the present invention can be adapted for use in a variety of processing systems where it is desired to track separate elements of an animal carcass through an inspection process on automated equipment, regardless of the specific animal species or the specific configuration of the processing equipment. In the process described above, a portion of the carcass remains on a first processing line (the "kill line" referred to above) while the greater portion of the carcass is transferred to a second processing line (the "evisceration line" referred to above). However, the present invention could be used with equal effectiveness in a system where the greater portion of the carcass remains on the first line and the part or parts are transferred to a second line, or where the parts and the carcass are both transferred to separate processing lines after being separated. Furthermore, the present invention could be used to track more than one type of part after removal from the carcass.

Although the invention has been described in connection with certain preferred embodiments, it is not intended to be limited thereto. Rather, the invention includes all embodiments which may fall within the scope of the following claims.

What is claimed is:

1. A method for harvesting portions of an animal carcass, comprising:
   (a) at a separation point on a first processing line, separating said animal carcass into a first portion and a second portion;
   (b) transporting said first portion on a first support means toward a first harvesting point;
   (c) transporting said second portion on a second support means toward a second harvesting point;
   (d) correlating the first support means and the second support means such that the first portion and the second portion are positively identified as originating from said animal carcass;
   (e) conducting an inspection of said second portion at an inspection point between said separation point and said second harvesting point to determine whether or not said second portion meets a predetermined standard;
   (f) harvesting said second portion at the second harvesting point, unless it is determined that the second portion does not meet said predetermined standard; and
   (g) harvesting said first portion at said first harvesting point unless one or more predetermined conditions exist, one of said conditions comprising a failure of the second portion to meet said predetermined standard as determined by said inspection.

2. The method according to claim 1, wherein said first portion and said second portion are transported toward said respective first and second harvesting points on separate processing lines.

3. The method according to claim 2, wherein said first portion is transported toward said first harvesting point on said first processing line and said second portion is transported toward said second harvesting point on a second processing line.

4. The method according to claim 3, wherein said first processing line and said second processing line are operated independently of one another.

5. The method according to claim 3 wherein, if it is determined by the inspection that the second portion does not meet said predetermined standard, the second portion is removed from the second processing line after passing said inspection point and before reaching the second harvesting point.

6. The method according to claim 5, further comprising the step of using detecting means to detect the presence of said second portion at a detection point on said second processing line past said inspection point, wherein detection of the second portion indicates that the second portion meets said predetermined standard and a failure to detect the second portion indicates that the second portion does not meet said predetermined standard.

7. The method according to claim 6 wherein, if the detection means fails to detect the second portion, a signal is sent to harvesting means located at the first harvesting point, causing the harvesting means not to harvest the first portion.

8. The method according to claim 1 wherein, prior to separating the carcass into said first and second portions, the carcass is transported to said separation point on said first support means and said first portion remains on said first support means after separation from the second portion.

9. The method according to claim 8, wherein the animal carcass is at least partially supported on said first support means by said first portion prior to separation in step (a).

10. The method according to claim 8, further comprising transferring the second portion to said second support means after separation from said first portion in step (a).

11. The method according to claim 10, wherein a plurality of detection means are provided to detect the presence of the second portion at a plurality of detection points on said second processing line.

12. The method according to claim 1, wherein another of said predetermined conditions comprises an inability to positively match said first portion and said second portion.

13. The method according to claim 1, wherein said animal carcass is a chicken carcass.

14. The method according to claim 13, wherein said first portion comprises a pair of chicken feet and said second portion comprises said carcass with said pair of feet removed.

15. The method according to claim 14, wherein said first processing line comprises a kill line on which chickens are slaughtered, bled and defeathered prior to reaching said separation point, and wherein said second processing line comprises an evisceration line on which the chicken carcasses are eviscerated before reaching said inspection point.

16. The method according to claim 1, wherein said predetermined standard comprises a predetermined quality standard.

17. A method for harvesting chicken paws of edible quality from a chicken carcass, comprising:
   (a) transporting said chicken carcass along a kill line to a separation point, said chicken carcass being supported by its feet in a kill line shackle;

(b) at said separation point, separating said feet from said carcass such that said feet remain attached to said kill line shackle;

(c) transferring said carcass, after separation from its feet, to an evisceration line by hanging said carcass on an evisceration line shackle;

(d) transporting said feet along said kill line toward a paw harvesting station;

(e) transporting said carcass along said evisceration line toward a carcass harvesting station;

(f) correlating the kill line shackle and the evisceration line shackle such that the feet are positively identified as having been separated from said chicken carcass;

(g) conducting an inspection of said carcass at an inspection point between said separation point and said carcass harvesting station to determine whether or not said carcass meets a predetermined quality standard;

(h) harvesting said carcass at the carcass harvesting station, unless it is determined that the carcass does not meet said predetermined quality standard; and (i) harvesting said feet at said paw harvesting station unless one or more predetermined conditions exist, one of said conditions comprising a failure of the carcass to meet said predetermined quality standard.

18. The method according to claim 17 wherein, if it is determined by the inspection that the carcass does not meet said predetermined quality standard, the carcass is removed from the evisceration line after passing said inspection point and before reaching the carcass harvesting station.

19. The method according to claim 18, further comprising the step of using sensors to detect the presence of said carcass at a detection point on the evisceration line past said inspection point, wherein detection of the carcass by the sensor indicates that the carcass meets said predetermined quality standard and a failure by the sensor to detect the carcass indicates that the carcass does not meet said predetermined quality standard.

20. The method according to claim 19 wherein, if the sensor fails to detect the carcass, a signal is sent to a paw cutter located at the paw harvesting station, causing the paw cutter not to cut the feet from the evisceration line shackle.

21. The method according to claim 20, wherein a plurality of sensors are provided to detect the presence of the carcass at a plurality of detection points on said evisceration line.

22. The method according to claim 17, further comprising evisceration of said carcasses prior to inspection of the carcass at said inspection point, said evisceration comprising opening a body cavity of said carcass and removing a viscera pack therefrom.

23. The method according to claim 22, wherein said inspection comprises an internal inspection of said body cavity.

24. The method according to claim 23, wherein said inspection further comprises and inspection of said viscera pack.

25. The method according to claim 23, further comprising an external inspection which is conducted prior to evisceration and after transfer of the carcass to the evisceration line.

26. The method according to claim 25 wherein, if it is determined by said external inspection that the carcass does not meet said predetermined quality standard, the carcass is removed from the evisceration line immediately after said external inspection.

27. The method according to claim 17, wherein said carcass is of edible quality if it is determined to meet said predetermined quality standard.

28. The method according to claim 17, wherein another of said predetermined conditions comprises an inability to positively match the feet to the carcass.

* * * * *